United States Patent
Gunturu et al.

(10) Patent No.: US 9,671,510 B2
(45) Date of Patent: Jun. 6, 2017

(54) THREE/FOUR DIMENSIONAL DATA MANAGEMENT AND IMAGING FOR BIG OILFIELD DATA

(71) Applicants: Sashi B. Gunturu, Katy, TX (US); Daniel H. Morgan, Houston, TX (US)

(72) Inventors: Sashi B. Gunturu, Katy, TX (US); Daniel H. Morgan, Houston, TX (US)

(73) Assignee: PETRABYTES INC., Houston, TX (US)

( * ) Notice: Subject to any disclaimer, the term of this patent is extended or adjusted under 35 U.S.C. 154(b) by 164 days.

(21) Appl. No.: 14/629,011

(22) Filed: Feb. 23, 2015

(65) Prior Publication Data

US 2015/0241581 A1 Aug. 27, 2015

Related U.S. Application Data (63) Continuation-in-part of application No. 14/626,622, filed on Feb. 19, 2015, now abandoned.

(60) Provisional application No. 61/943,207, filed on Feb. 21, 2014.

(51) Int. Cl.
  *G01V 1/24* (2006.01)
  *G01V 1/34* (2006.01)
  *G01V 1/18* (2006.01)
  *G01V 1/40* (2006.01)

(52) U.S. Cl.
  CPC ............... *G01V 1/24* (2013.01); *G01V 1/181* (2013.01); *G01V 1/34* (2013.01); *G01V 1/345* (2013.01); *G01V 1/40* (2013.01); *G01V 2210/74* (2013.01)

(58) Field of Classification Search
  CPC ..... G01V 1/24; G01V 1/34; G01V 1/40; G01V 1/181; G01V 1/345; G01V 2210/74
  USPC ....................................... 367/11, 38
  See application file for complete search history.

(56) References Cited

U.S. PATENT DOCUMENTS

| | | | | |
|---|---|---|---|---|
| 5,966,672 | A * | 10/1999 | Knupp | G01V 1/34 702/16 |
| 2003/0004817 | A1* | 1/2003 | Caine | G01V 11/00 705/27.2 |
| 2003/0011622 | A1* | 1/2003 | Yomdin | H04B 1/52 345/630 |

OTHER PUBLICATIONS

Gasperini et al., "SEISPRHO: An interactive computer program for processing and interpretation of high-resolution seismic reflection profiles," Computers & Geosciences 35 (2009) 1497-1507.*

(Continued)

*Primary Examiner* — Daniel L Murphy
(74) *Attorney, Agent, or Firm* — Patterson + Sheridan, LLP (57) ABSTRACT

Oilfield and wellbore data may include geophone data (seismic) and airborne surveys such as microseep data, as well as fiber optic measurements collected utilizing a distributed sensing system. Continuous monitoring of various oilfield and wellbore properties, such as temperature, pressure, Bragg gradient, acoustic, and strain, and the like, may generate a large volume of data, possibly spanning into several terabytes. Embodiments of the present invention provide techniques for visualizing a large volume of such measurements taken in an oilfield or wellbore without down-sampling measurement data.

18 Claims, 10 Drawing Sheets

(56) References Cited

OTHER PUBLICATIONS

Campbell, "Behind the Graphics2D: The OpenGL-based Pipeline," 2004, downloaded Sep. 28, 2016 from https://web.archive.org/web/20090424082607/http://today.java.net/cs/user/print/a/147, 4 pp.*

* cited by examiner

THREE/FOUR DIMENSIONAL DATA MANAGEMENT AND IMAGING FOR BIG OILFIELD DATA

CROSS-REFERENCE TO RELATED APPLICATIONS

This application claims the priority benefit of provisional U.S. patent application entitled "DATA IMAGING OF RESEVOIR MONITORING DATA," having Ser. No. 61/943,207 and filed on Feb. 21, 2014, which is incorporated herein by reference in its entirety. This application is a continuation-in-part of U.S. patent application entitled "THREE/FOUR DIMENSIONAL IMAGING FOR BIG OILFIELD DATA," having Ser. No. 14/626,622 and filed on Feb. 19, 2015, which is incorporated herein by reference in its entirety.

BACKGROUND OF THE INVENTION

Field of the Invention

Embodiments of the present invention generally relate to methods and apparatus for analyzing measurements taken in a wellbore, or more generally in an area or oilfield with potential hydrocarbons. In particular, embodiments of the present invention relate to methods and apparatus for three/four dimensional data management and imaging of big oilfield measurement data.

Description of the Related Art

Oilfield measurements, including geophone data (seismic) and airborne surveys such as microseep data, can help in characterizing the subsurface with geological mapping and hydrocarbon detection. The data gathered from these techniques can be significantly large, and accurate visualization of data without data reduction may be required to identify detailed subsurface geometries. The subsurface is also constantly changing as a result of production or operation activities such as steam injection (e.g., steam assisted gravity drainage—SAGD). In these situations, 4D seismic measurements may need to be gathered and mapped to understand the subsurface/reservoir changes.

In addition to the oilfield measurements discussed above, various reservoir monitoring systems have been used to measure important properties such as pressure, temperature, acoustic, strain, and Bragg gradient along the wellbore. Formation properties at downhole subsurface conditions, like porosity, permeability, density, mineral content, electrical conductivity, and bed thickness, and computed fluid properties such as viscosity, chemical elements, and the content of oil, water, and/or gas are essential. Monitoring such properties and conditions, either instantaneously or by determining trends over time, may have significant value in understanding fluid flow through different fluid entries in the producing zones. Examples of reservoir monitoring include utilizing distributed temperature sensing (DTS) or distributed acoustic sensing (DAS) along a length of a wellbore, such that the monitoring is performed with the functional equivalent of tens, hundreds, or thousands of sensors. In other words, a fiber optic cable may function as a continuous sensor. An example of a DAS system will be further described.

Figure 1:
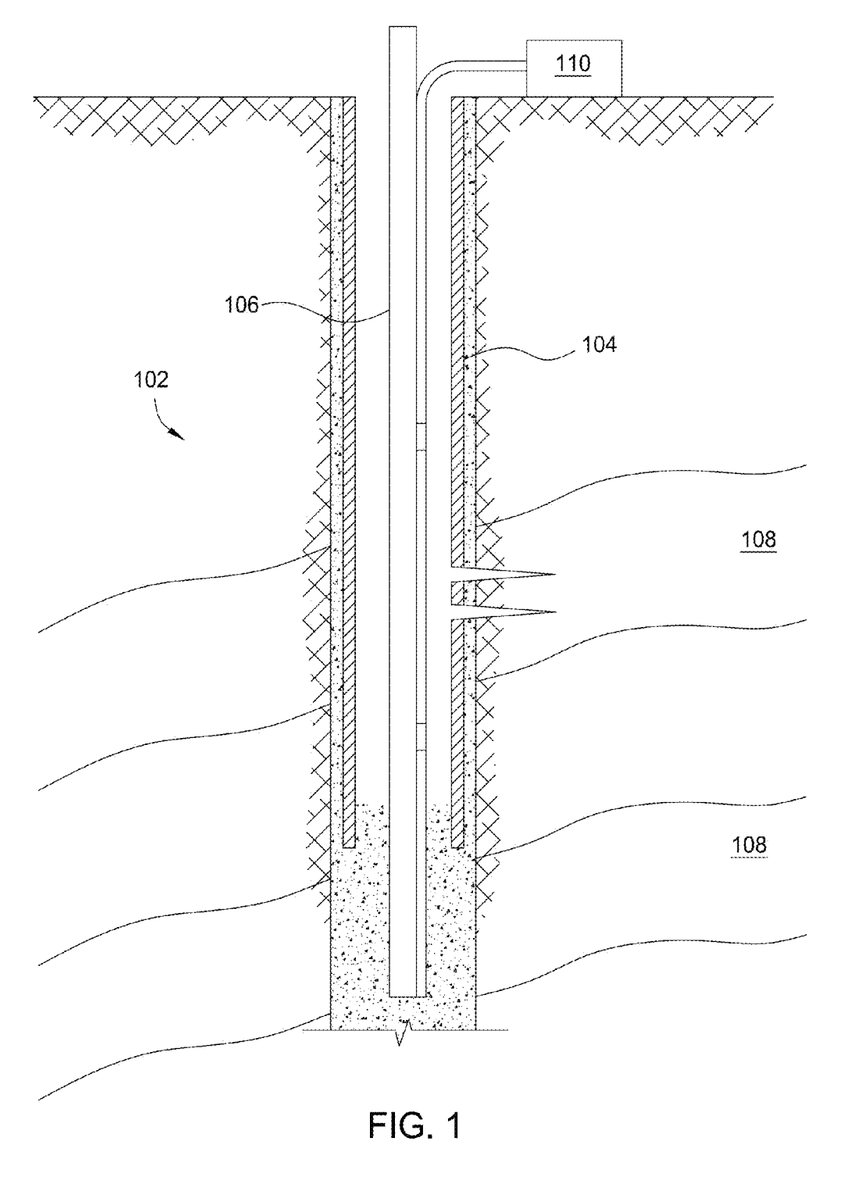
FIG. 1 illustrates a schematic cross-sectional view of a wellbore, wherein a distributed sensing system may be used to perform sensing, according to an embodiment.

FIG. 1 illustrates a schematic cross-sectional view of a wellbore 102, wherein a DAS system 110 may be used to perform acoustic sensing. A DAS system may be capable of producing the functional equivalent of tens, hundreds, or even thousands of acoustic sensors. Properties of the wellbore 102, a wellbore completion (e.g., casing, cement, production tubing, packers), and/or downhole formations and interstitial fluid properties surrounding or otherwise adjacent the wellbore 102 may be monitored over time based on the acoustic sensing. Further, hydrocarbon production may be controlled, or reservoirs 108 may be managed, based on these monitored properties.

The wellbore 102 may have a casing 104 disposed within, through which production tubing 106 may be deployed as part of a wellbore completion. The DAS system 110 may comprise an acoustic energy source and a DAS device. An active acoustic energy source may generate and emit acoustic signals downhole. For some embodiments, an active acoustic energy source may not be involved in situations where acoustic signals are generated passively (e.g., seismic or microseismic activity). The acoustic signals may interact with the wellbore 102, the wellbore completion, and/or various downhole formations or fluids adjacent the wellbore, leading to transmitted, reflected, refracted, absorbed, and/or dispersed acoustic signals. Measured acoustic signals may have various amplitude, frequency, and phase properties affected by the downhole environment, which may stay constant or change over time. Useful instantaneous, relative changes, time lapse, or accumulated data may be derived from the DAS system 110.

An optical waveguide, such as an optical fiber, within the wellbore 102 may function as the DAS device, measuring disturbances in scattered light that may be propagated within the waveguide (e.g., within the core of an optical fiber). The disturbances in the scattered light may be due to the transmitted, reflected, and/or refracted acoustic signals, wherein these acoustic signals may change the index of refraction of the waveguide or mechanically deform the waveguide such that the optical propagation time or distance, respectively, changes.

The DAS device generally includes employing a single fiber or multiple fibers in the same well and/or multiple wells. For example, multiple fibers may be utilized in different sections of a well, so that acoustic sensing may be performed in the different sections. Sensing may occur at relative levels or stations, immediately adjacent depth levels, or spatially remote depths. The DAS device may involve continuous or periodic dense coiling around a conduit to enhance detection, and coiling the fiber in various physical forms or directions may enhance dimensional fidelity.

The system 110 may have various effective measurement spatial resolutions along the DAS device, depending on the selected pulse widths and optical power of the laser or light source, as well as the acoustic source signature. Therefore, the DAS device may be capable of producing the functional equivalent of tens, hundreds, or even thousands of acoustic sensors along the waveguide, wherein acoustic sensors and/or their functional DAS equivalents may be used for the DAS system 110 in addition to the acoustic source.

Oilfield and wellbore data measurements, such as those previously discussed, are rapidly growing, especially in sensors such as distributed temperature, pressure, acoustic, strain, and chemical sensing. The datasets from sensing are typically obtained at high frequency and time intervals, and the generated data can be in the terabytes. Traditional techniques are inadequate for analyzing such large volumes of data, and most techniques decimate the data. As a result, the original resolution of the data can be lost and specific events particular times may not be analyzed and may instead be lost in the decimation or downsampling.

SUMMARY OF THE INVENTION

One embodiment includes a method of storing and managing measurements taken in an oilfield or wellbore. This method may generally include receiving the measurements as raw data, the raw data being acquired by an oilfield measurement or wellbore monitoring device, and converting the raw data to image rasters. The converting does not comprise down-sampling the raw data. The method may further include assigning a unique identifier (UID) to each image raster, and storing the image rasters along with the assigned UIDs.

Another embodiment includes a non-transitory computer-readable storage media storing instructions, which when executed by a computer system, perform operations for storing measurements taken in an oilfield or wellbore. The operations include receiving the measurements as raw data, where the raw data is acquired by an oilfield measurement or wellbore monitoring device. The operations further include converting the raw data to image rasters, where the converting does not comprise down-sampling the raw data. In addition, the operations include assigning a unique identifier (UID) to each image raster, and storing the image rasters along with the assigned UIDs.

Yet another embodiment includes a system comprising a processor and a memory. The memory includes an application program configured to perform operations for storing measurements taken in an oilfield or wellbore, and the operations include receiving the measurements as raw data, where the raw data is acquired by an oilfield measurement or wellbore monitoring device. The operations further include converting the raw data to image rasters, where the converting does not comprise down-sampling the raw data. In addition, the operations include assigning a unique identifier (UID) to each image raster, and storing the image rasters along with the assigned UIDs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Collecting data during wellbore monitoring and making oilfield measurements such as geophone data (seismic) and airborne surveys, may produce large amounts of data, depending on the time interval and frequency of data measurements. Integrated sensing systems such as distributed temperature and acoustic sensing (DTAS) may also generate large data. For example, DAS data, when gathered at high frequency may generate on the order of 200 GB in a single day. As another example, distributed temperature measured along the length of the wellbore every minute, would generate 1,440 temperature profiles (24 hours×60 minutes=1,440 profiles), where each profile includes tens, hundreds, or even thousands of temperature measurements along the length of the wellbore. Embodiments disclosed herein provide techniques for visualizing a large volume of oilfield or wellbore measurements.

Figure 2A:
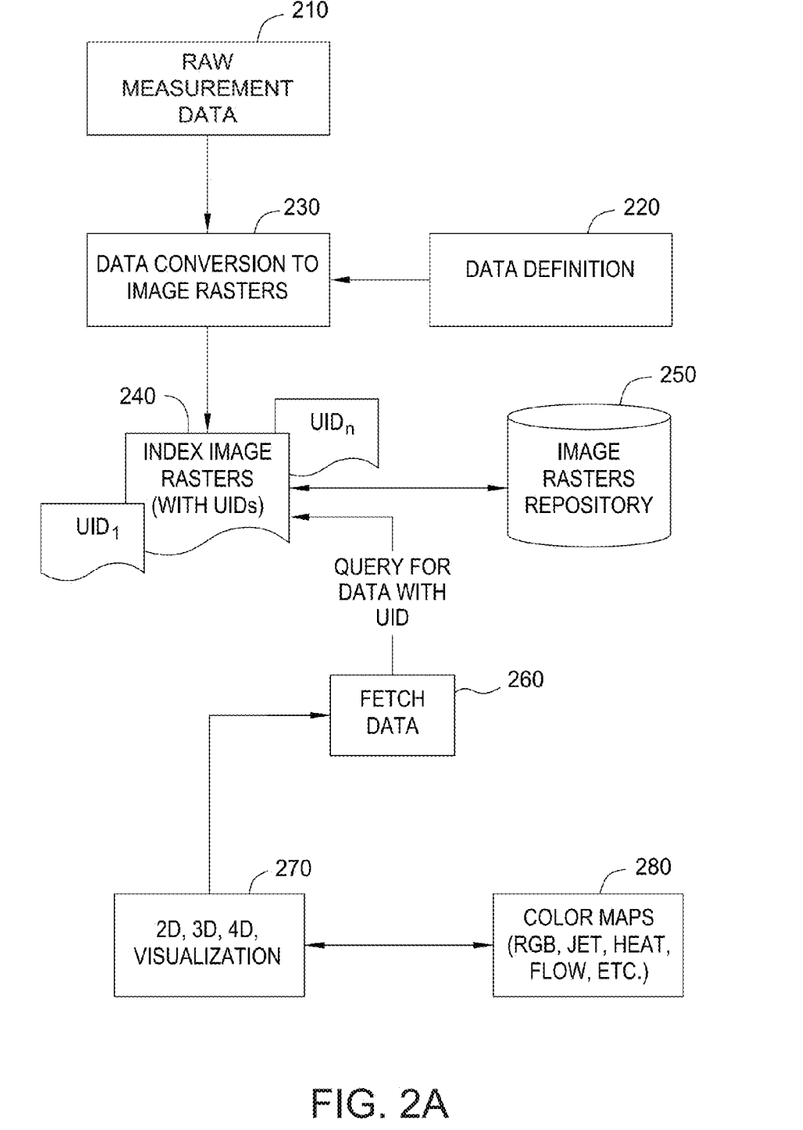
FIGS. 2A-2B illustrate approaches for storing and visualizing large oilfield or wellbore measurements, according to an embodiment.

FIG. 2A illustrates an approach for storing and visualizing large oilfield measurement or reservoir monitoring data, according to an embodiment. Illustratively, a data visualization application (not shown) receives raw oilfield (or wellbore) measurement data 210 and a data definition 220. The raw oilfield (or wellbore) measurement data 210 may include traces at multiple inline and crossline (also referred to herein as "xline") coordinate values. At each such inline-xline coordinate, there may be a trace comprising multiple (e.g., hundreds of) raw data points in time or depth, acquired by an oilfield measurement device such as a geophone (or a wellbore monitoring device such as a DAS or DTS device). One format in which the data 210 may be represented is SEG Y format, a standard format for storing geophysical data developed by the Society of Exploration Geophysicists (SEG). Other formats may of course be used. In addition, the coordinate system used need not be inline-xline, and may instead be, e.g., x-y, Universal Transverse Mercator (UTM), etc.

At 230, the data visualization application converts the raw data 210 to image rasters. As discussed, the data 210 may include trace data stored in a suitable format, e.g., SEG Y format. To convert the data 210 to image rasters, the data visualization application may parse each trace per the SEG Y format, convert the trace to an image raster, and stack the image rasters for traces along a given inline or xline value to form a single inline or xline image raster.

In one embodiment, the data visualization application may normalize data points associated with each trace to the range 0-255, corresponding to the 256 color spectrum. For example, if the trace data point represents velocity, as measured by a geophone, that is between 100 and 5000 m/s, then the value 100 may map to 0 in the 256 color spectrum, while 5000 may map to 255, and values between 100 and 5000 may map to corresponding values between 0 and 255. Then, image rasters for a set of traces having a given inline or xline coordinate value may be stacked together into a single image raster for that inline or xline value. That is, multiple image rasters associated with the given inline or xline coordinate value may be stacked together to form a continuous image raster for that inline or xline value.

In another embodiment, various color maps 280 may be applied in converting the raw data 210 to image rasters. In one embodiment, the color maps 280 may be selected by a user. For example, a user may select a color map that includes a red-green-blue (RGB) color spectrum. Continuing the example from above, if the raw data includes velocity measurements between 100 and 5000 m/s, then the value 100 may map to, e.g., 0 on the RGB color spectrum, while the value 5000 may map, e.g., to 255 on the RGB color spectrum, and values between 100 and 5000 may map to corresponding in the RGB color spectrum between 0 and 255. As another example, the color map may include a wave pattern generated using random, alternating, colors.

At 240, the data visualization application indexes the image rasters. In one embodiment, each trace may be assigned a UID. In addition, all trace image rasters along a given inline or xline may be stacked into an image raster for the given inline or xline, and each such image raster may be assigned a UID. In another embodiment, for time-based data, the UID may include a timestamp. Other conventions for specifying the UID may be devised by one of ordinary skill in the art. The data visualization application may generate metadata including the UID information for the traces and image rasters.

The traces, and inline/xline image rasters, may be ordered (e.g., in ascending order) by UID for efficient retrieval, and may then be stored in an image rasters repository 250. In one embodiment, the image rasters may be stored in a binary storage format such as, e.g., a custom HDF format. HDF is a binary format suitable for storing large data. In a particular embodiment, the data may be stored in HDF groups which include an original data group that stores raw data with a UID assigned for each trace; a coordinates group which stores x-y and inline-xline locations associated with each trace, mapped to the raw data by UID; an inlines group which includes inline image rasters generated from stacked xline trace image rasters for each inline, each inline image raster being assigned a UID; and an xlines group which includes xline image rasters generated from stacked inline trace image rasters, each xline image raster being assigned a UID. Of course, the image rasters may be stored in other any other feasible way, and using other data formats. The particular format used may be specified as the data definition 220.

At 270, the data visualization application generates 2D (e.g., inline), 3D (e.g., inline and xline), or 4D (e.g., inline, xline, and time) visualizations of the image rasters, which may be fetched by UID. As discussed, each trace, as well as each inline or xline image raster comprising stacks of inline or xline trace image rasters, respectively, may be assigned a unique ID. Further, the traces and image rasters may be ordered (e.g., in ascending order) by UID and stored in said order. In such a case, particular images or traces may be queried by UID and thereby fetched from the image rasters repository 250. In one embodiment, a user interface for displaying the 2D, 3D, or 4D visualizations may permit xline and inline images to be navigated sequentially. In such a case, the stored images may be fetched in order, an efficient operation given that the images are stored in order and thus a search need not be performed.

After the xline and inline images are fetched, the data visualization application may further convert the fetched images to a format for rendering to a display, such as the JAVA image format. As a result of their size, image rasters may be loaded into memory without down-sampling, unlike large raw measurement data. That is, downsampling may be eliminated by storing and retrieving image rasters representing raw data, as opposed to traditional techniques in which images were generated on-the-fly using large quantities of raw data that had to be down-sampled to fit into memory.

Figure 2B:
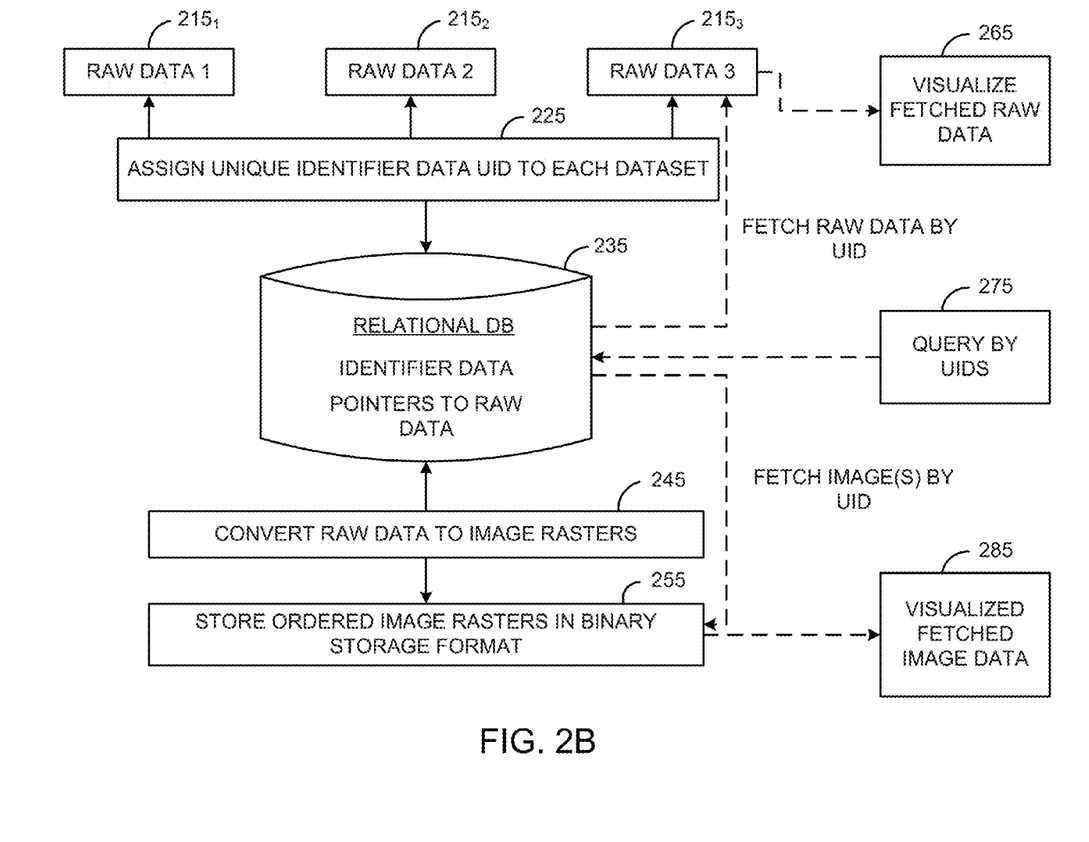

FIG. 2B illustrates another approach for storing and visualizing large oilfield or wellbore measurements, according to an embodiment. As shown, oilfield measurement (or wellbore monitoring) data, such as seismic or airborne survey data, is collected and stored as raw data 215. In another embodiment, the raw data 215 may include wellbore monitoring data acquired by a wellbore monitoring device such as a DAS or DTS device or seismic or any time based measurement. Illustratively, the raw data is stored in a distributed environment spread across multiple locations $215_{1-3}$, but the raw data 215 may also by stored at a single location. As discussed, the raw oilfield measurement data or wellbore monitoring data 215 may include traces at multiple inline and xline coordinate values. At each such inline-xline coordinate, there may be a trace comprising multiple (e.g., hundreds of) raw data points in time or depth, acquired by an oilfield measurement device such as a geophone (or a wellbore monitoring device such as a DAS or DTS device), and the data 215 may be represented in, e.g., SEG Y or another format. In addition, the coordinate system used need not be inline-xline, and may instead be, e.g., x-y, Universal Transverse Mercator (UTM), etc.

At 225, unique identifier (UID) data is assigned to each data set. For example, the UID may include inline and xline coordinates of traces in three-dimensional (X,Y,Z) space. As another example, for time-based data, the UID may include a timestamp. Other conventions for specifying the UID may be devised by one of ordinary skill in the art.

After the UID is assigned to data sets, reference data, including the identifier UID data, is stored in a relational data structure 235 which may be, e.g., a database. In one embodiment, the reference identifier (including the UID) data is stored separately from actual measurement data 215. As discussed, the original measurement data 215 may be stored in a distributed environment spread across multiple locations. In such a case, the reference identifier may also include a pointer to the location of the actual measurement in a distributed relational data structure. Storing such reference data, including the UID and the pointer, may speed up the fetching or querying of the raw data 215 by allowing the relevant data to be located using the reference information in the relational data structure 235 without having to read the raw data 215 itself. Once the location is identified by querying the relational database 235 by UID at 275, the associated raw data 215 can be fetched without reading any other raw data, thereby helping to quickly locate specific portions of data when analyzing large oilfield or wellbore monitoring datasets. In the case of the distributed relational data structure discussed above, the raw data measurements 215 may be retrieved using the data location pointer information in additional to the UID.

For example, to analyze one terabyte of seismic data, UIDs (e.g., inlines and xlines) may be stored in the relational data structure 235 with references (e.g., pointers) to the original measurements. The original measurements (seismic gathers) may be stored as raw data 215 in, for example, HDF format. Then, a block of data may be fetched using the UID (e.g., start xline, start inline, end xline, end inline) set for the block, thereby permitting the relevant measurement data to be quickly fetched without extensive search and reading of the data itself. The fetched data may further be visualized for display at 265, in any feasible manner, including well-known visualization techniques.

At 245, the oilfield (or wellbore) measurement data 215 is converted to image rasters. As discussed, the raw data 215 may include trace data stored in a suitable format, e.g., SEG Y format. In such a case, to convert the measurement data 215 to image rasters, a data visualization application may parse each trace per the SEG Y format, convert the trace to an image raster, and stack the image rasters for traces along a given inline or xline value to form a single inline or xline image raster.

In one embodiment, the data visualization application may normalize data points associated with each trace to the range 0-255, corresponding to the 256 color spectrum. Further, image rasters for a set of traces having a given inline or xline coordinate value may be stacked together into a single image raster for that inline or xline value. In such a case, multiple image rasters associated with the given inline or xline coordinate value may be stacked together to form a continuous image raster for that inline or xline value. In another embodiment, color maps may be applied in converting the raw data to image rasters. For example, a user may select a color map that includes a red-green-blue (RGB) color spectrum, or a color map that includes a wave pattern generated using random, alternating, colors.

As discussed, each trace may be assigned a unique identifier (UID) in one embodiment. In addition, all trace image rasters along a given inline or xline may be stacked into an image raster for the given inline or xline, and each such image raster may be associated with a UID. In one embodiment, the traces, and inline/xline image rasters, may be ordered (e.g., in ascending order) by UID for efficient retrieval, and may then be stored in an image rasters repository at 255. In one embodiment, the image rasters may be stored in a binary storage format such as, e.g., a custom HDF format. In a particular embodiment, the data may be stored in HDF groups which include an original data group that stores raw data with a UID assigned for each trace; a coordinates group which stores x-y and inline-xline locations associated with each trace, mapped to the raw data by UID; an inlines group which includes inline image rasters generated from stacked xline trace image rasters for each inline, each inline image raster being assigned a UID; and an xlines group which includes xline image rasters generated from stacked inline trace image rasters, each xline image raster being assigned a UID. As discussed, the image rasters may be stored in any other feasible way, and using other data formats, with the particular format used being specified in a user-defined data definition.

At 285, the data visualization application generates two-dimensional (2D) (e.g., inline), three-dimensional (3D) (e.g., inline and xline), and/or four-dimensional (4D) (e.g., inline, xline, and time) visualizations of the image rasters, which may be fetched by UID by querying the relational data structure 235, at 275. As discussed, each trace, as well as each inline or xline image raster comprising stacks of inline or xline trace image rasters, respectively, may be assigned a unique ID, and the traces and image rasters may also be ordered (e.g., in ascending order) by UID and stored in said order. Particular images or traces may then be queried by UID and fetched from the image rasters repository. In one embodiment, a user interface for displaying the 2D, 3D, or 4D visualizations may permit xline and inline images to be navigated sequentially. In such a case, the stored images may be fetched in order, an efficient operation given that the images are stored in order and a thus a search need not be performed. As discussed, the data visualization application may further convert fetched images to a format for rendering to a display, such as the JAVA image format. As a result of their size, image rasters may be loaded into memory without down-sampling, unlike large raw measurement data.

Figure 3A:
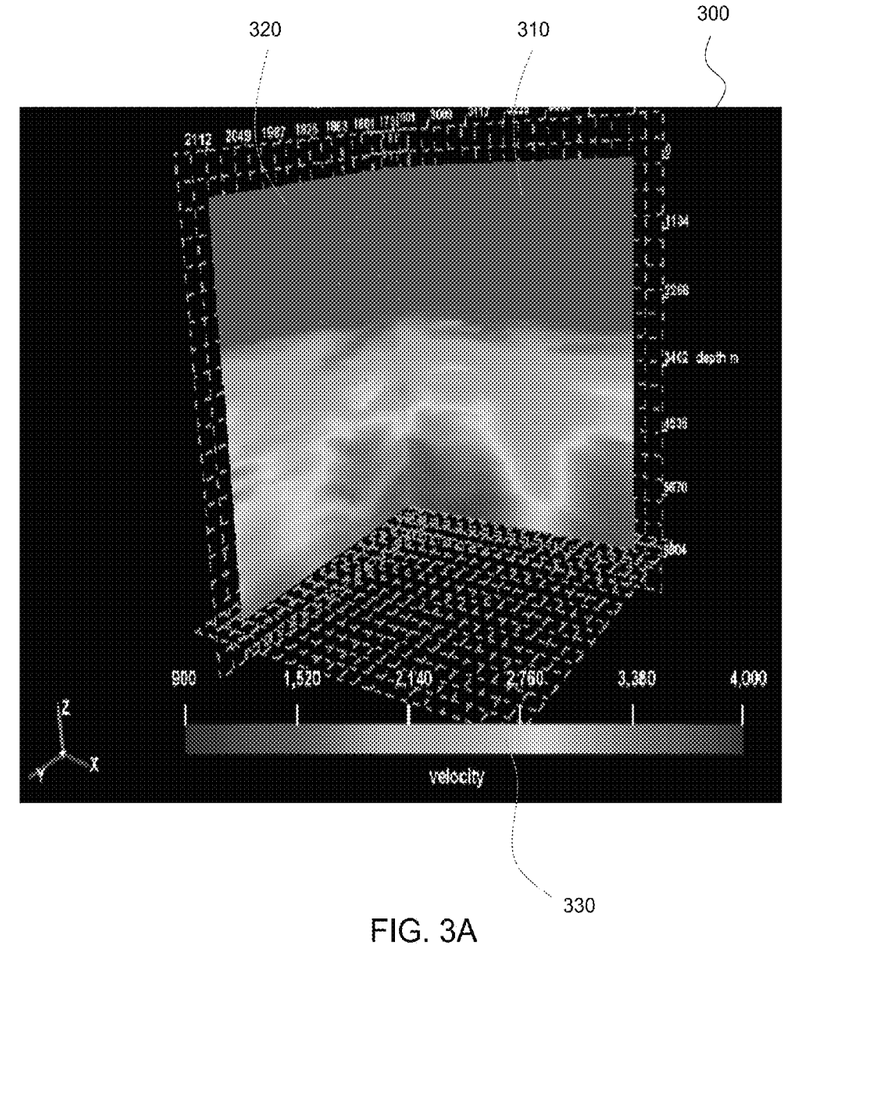
FIGS. 3A-3B illustrate example two and three-dimensional visualizations of seismic measurements, according to an embodiment. There could be time-lapse (4D) (or repeat) seismic measurements to understand the effects of changing subsurface as a result of hydrocarbon production, water or gas injection or any other activity that has changed the subsurface geometry and composition.
Figure 3B:
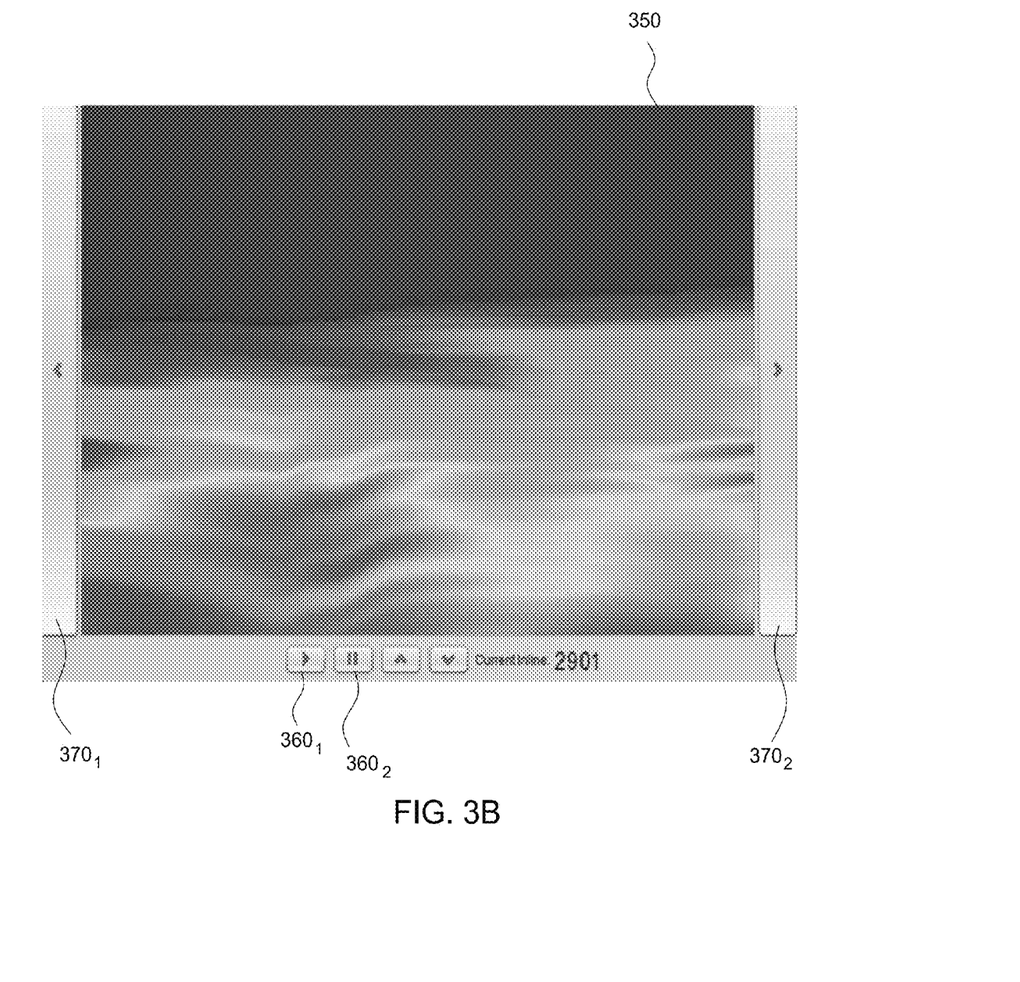

FIGS. 3A-3B illustrate example 2D and 3D visualizations of oilfield seismic measurements, according to an embodiment. As shown in FIG. 3A, a 3D visualization 300 of the seismic measurements includes an x image 320 comprising stacked trace images (for multiple y coordinates) along a given x coordinate value. Similarly, a y image 310 in the 3D visualization 300 includes stacked trace images along a given y coordinate value. Illustratively, the x image 320 and y image 310 are rendered as orthogonal planes in a 3D grid. Although depicted with respect to x-y coordinates, any coordinate system may be used, including inline-xline, UTM, etc. The user may also be permitted to navigate through multiple x and y images (or inline and xline images, etc.) so as to view the images for desired x and y coordinate values (or inline and xline coordinates, etc.). For example, the user may be permitted to navigate the images in order of ascending or descending x and y coordinate values. In such a case, the data visualization application may fetch the appropriate x and y image rasters from image rasters repository 250 by UID, covert the fetched image rasters to a format for rendering to a display, such as JAVA image format, and display the rendered images to a user in the 3D visualization 300.

As shown in FIG. 3B, a 2D visualization 350 of the seismic measurements includes an inline image 310 for inline coordinate value 2901. Although depicted with respect to an inline image, an xline image or an image for another coordinate system (e.g., the x-y coordinate system, UTM, etc.) may instead be displayed. Illustratively, navigation buttons $360_{1-2}$, $370_{1-2}$ are provided so that a user may navigate through multiple inline images in ascending or descending order. The data visualization application may then fetch the appropriate inline image from image rasters repository 250 by UID, covert the fetched image rasters to a format for rendering to a display, such as JAVA image format, and display the rendered images to a user in the 2D visualization 200.

Although the data is depicted as being symmetric, visualizations of oilfield (or wellbore) measurements having irregular shapes may be generated and viewed in a similar manner. In such cases, the irregularly-shaped data may be re-sampled into a planar view and arranged as images. For example, data having a spherical shape may be cut into planes, and the traces in those planes converted to images, which are then stacked to form planar images. Where no data is available in any given plane, a color value representing null, such as (0,0,0), may be assigned.

Figure 4A:
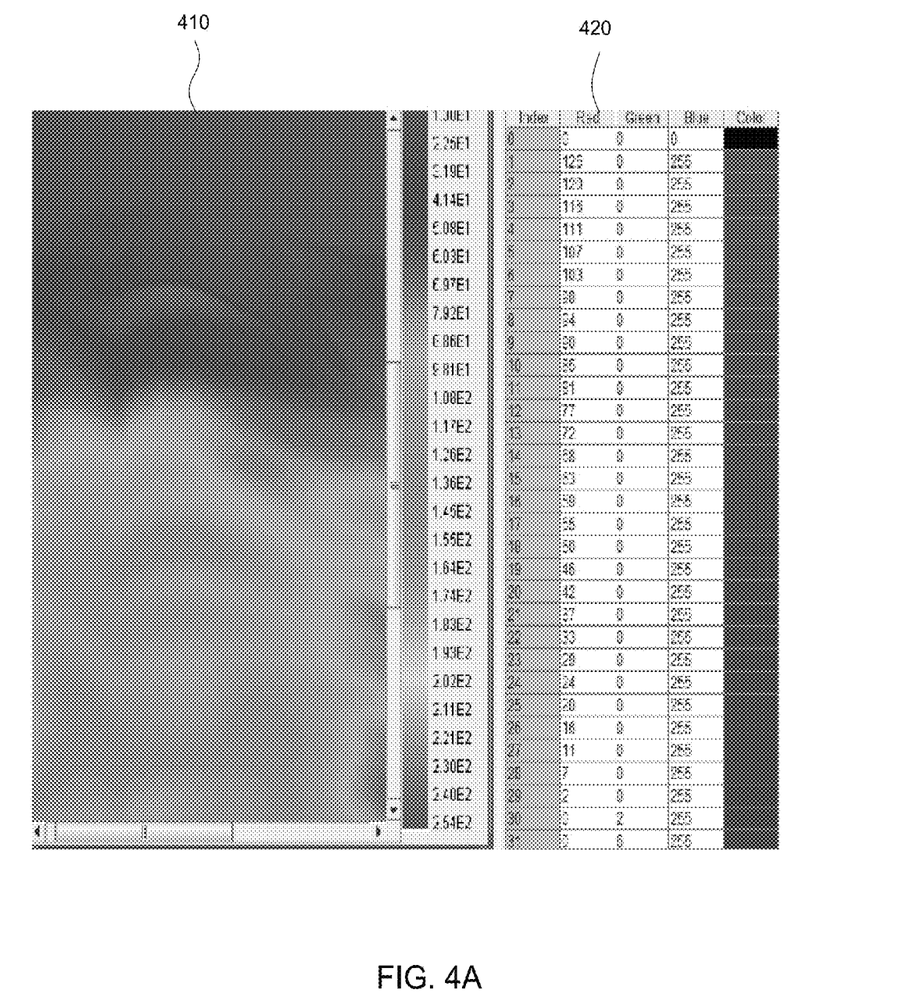
FIGS. 4A-4B illustrate example two-dimensional seismic measurement visualizations using different color maps, according to an embodiment.
Figure 4B:
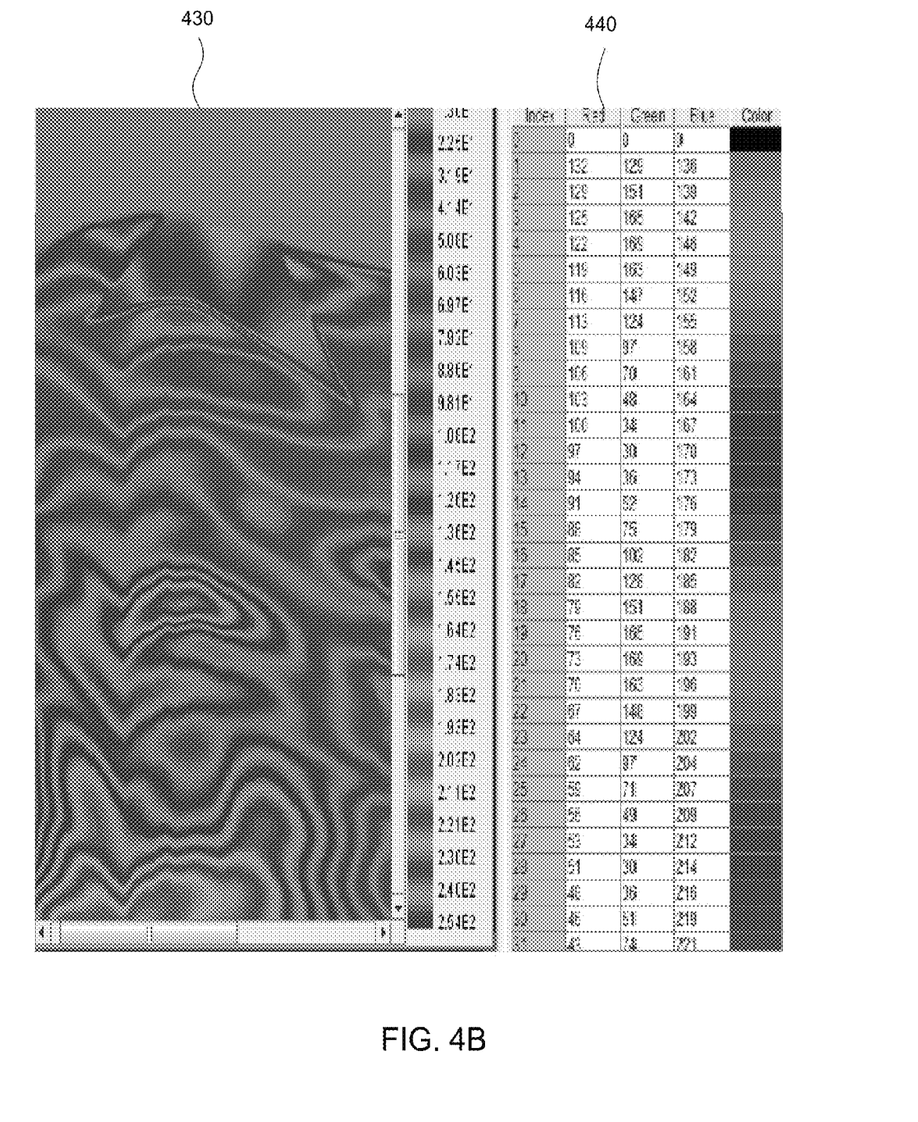

FIGS. 4A-4B illustrate example 2D oilfield seismic measurement visualizations using different color maps, according to an embodiment. As shown in FIG. 4A, the color map 420 may be a RGB color spectrum. More specifically, the data visualization application may normalize each raw data value to the range 0-255, which maps (according to the "index") to one of the colors in the RGB color spectrum of the color map 420. The resulting image raster may be stored in image storage repository 250, then fetched and displayed as image 410 to a user. FIG. 4B illustrates a different color map 440 in which randomly chosen colors, in an alternating wave pattern, are used. In the alternating wave pattern, a property scale (e.g., associated with temperature, pressure, acoustic, etc.) may be divided into user-defined intervals, and a particular color may be applied to each interval. Allowing users the flexibility to define intervals may aid in the identification of small changes in data. For example, a one degree temperature change may be visualized using this approach.

For some embodiments, color scales may be defined for a given oilfield (e.g., an exploration area), and may be applied to all wells monitored in that field. Having a similar color scale for all the wells monitored in a field may allow for consistent visualization capabilities and comparison between the wells.

The user may select one of color maps 420, 440, among others (e.g., jet, heat, flow, etc. color maps), to apply in converting the raw data to image rasters. Note, although discussed with respect to applying color maps during the conversion of raw data to image rasters, color maps may instead be applied after said conversion. For example, the raw data may be converted to image rasters, and pixel values of the image rasters may later be mapped to particular colors according to the color map.

Figure 5:
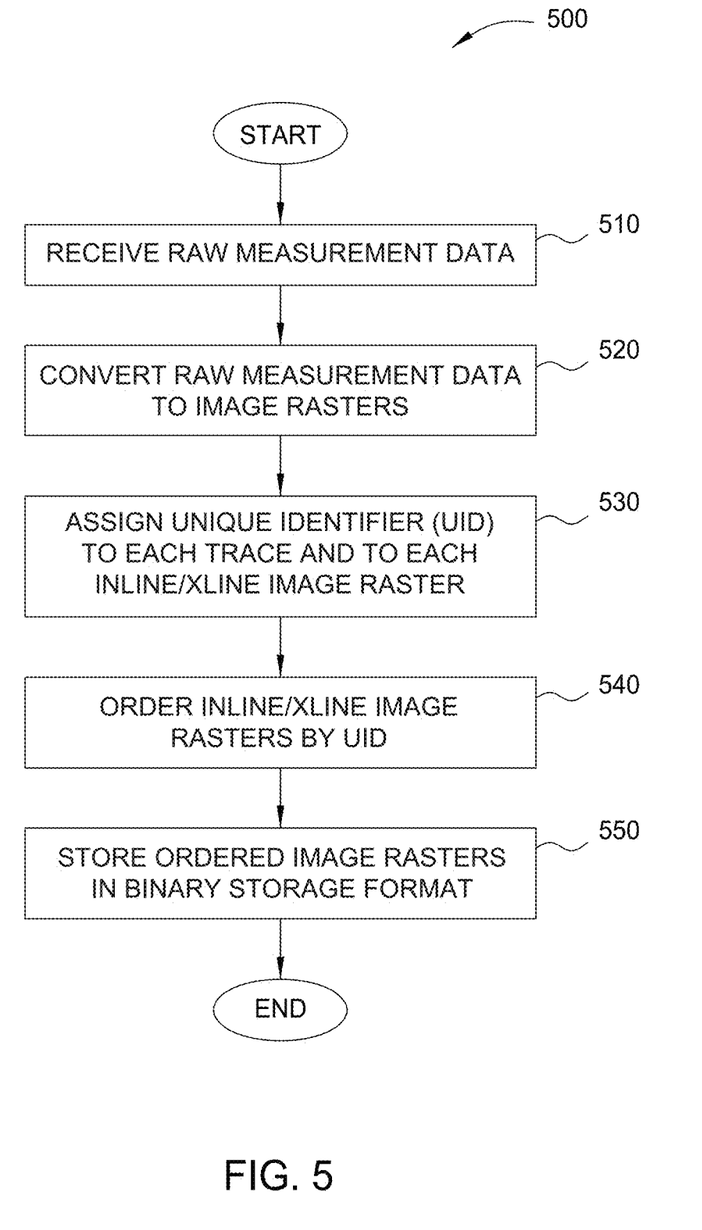
FIG. 5 illustrates a method for storing oilfield or wellbore measurement data as image rasters, according to an embodiment.

FIG. 5 illustrates a method 500 for storing oilfield (or wellbore) measurement data as image rasters, according to an embodiment. As shown, the method 500 begins at step 510, where a data visualization application receives raw oilfield (or wellbore) measurement data. The raw measurement data may include traces at a number of inline-xline coordinates. At each such inline-xline coordinate, there may be a trace comprising multiple (e.g., hundreds of) raw data points in time or depth, as acquired by a fiber optic measuring device such as a DAS or DTS device or a geophone for seismic. Of course, other coordinate systems (e.g., x-y coordinates, UMT coordinates, etc.) may also be used. In one embodiment, the raw measurement data may be received in SEG Y format.

At step 520, the data visualization application converts the raw measurement data to image rasters. In one embodiment, the data visualization application may read all data associated with a given inline and normalize the data to 0-255 values of the 256 color spectrum. In a particular embodiment, the data visualization application may convert each trace along the given inline to image rasters by normalizing the raw data values, and stack those image rasters to form an image raster for the given inline. Similar operations may be performed to normalize data along any given xline, or along an axis value of some other coordinate systems (e.g., x-y, UTM, etc.), and obtain image rasters for the given xline or other coordinate value.

In another embodiment, the data visualization application may convert the raw measurement data to image rasters according to a color map, which may be, e.g., selected by a user and may be an RGB spectrum, random colors in an alternating wave pattern, jet, heat, flow, etc. color maps.

At step 530, the data visualization application assigns UIDs to each trace and to each inline/xline image raster. Doing so permits those traces and image rasters to be stored and retrieved by UID. In one embodiment, assigning UIDs to traces and image rasters may include generating metadata for the traces and image rasters, where the metadata includes the UIDs. As previously discussed, UIDs may also be assigned to the raw data itself, permitting the fetching or querying of the raw data using the UIDs (and perhaps other reference information such as pointers) stored in a relational data structure, without having to read the raw data itself.

At step 540, the data visualization application orders the inline/xline image rasters by UID. Doing so permits retrieval of the image rasters by ascending/descending UID to be more efficient, as a search need not be performed to locate desired image rasters.

Then, at step 550, the data visualization application stores the ordered image rasters in a binary storage format. In one embodiment, the binary format used may be a custom HDF format, used to store large quantities of data. In a particular embodiment, the data may be stored in HDF groups which include an original data group that stores raw data with a UID assigned for each trace; a coordinates group which stores x-y and inline-xline locations associated with each trace, mapped to the raw data by UID; an inlines group which includes inline image rasters generated from stacked xline trace image rasters for each inline, each inline image raster being assigned a UID; and an xlines group which includes xline image rasters generated from stacked inline trace image rasters, each xline image raster being assigned a UID.

Figure 6:
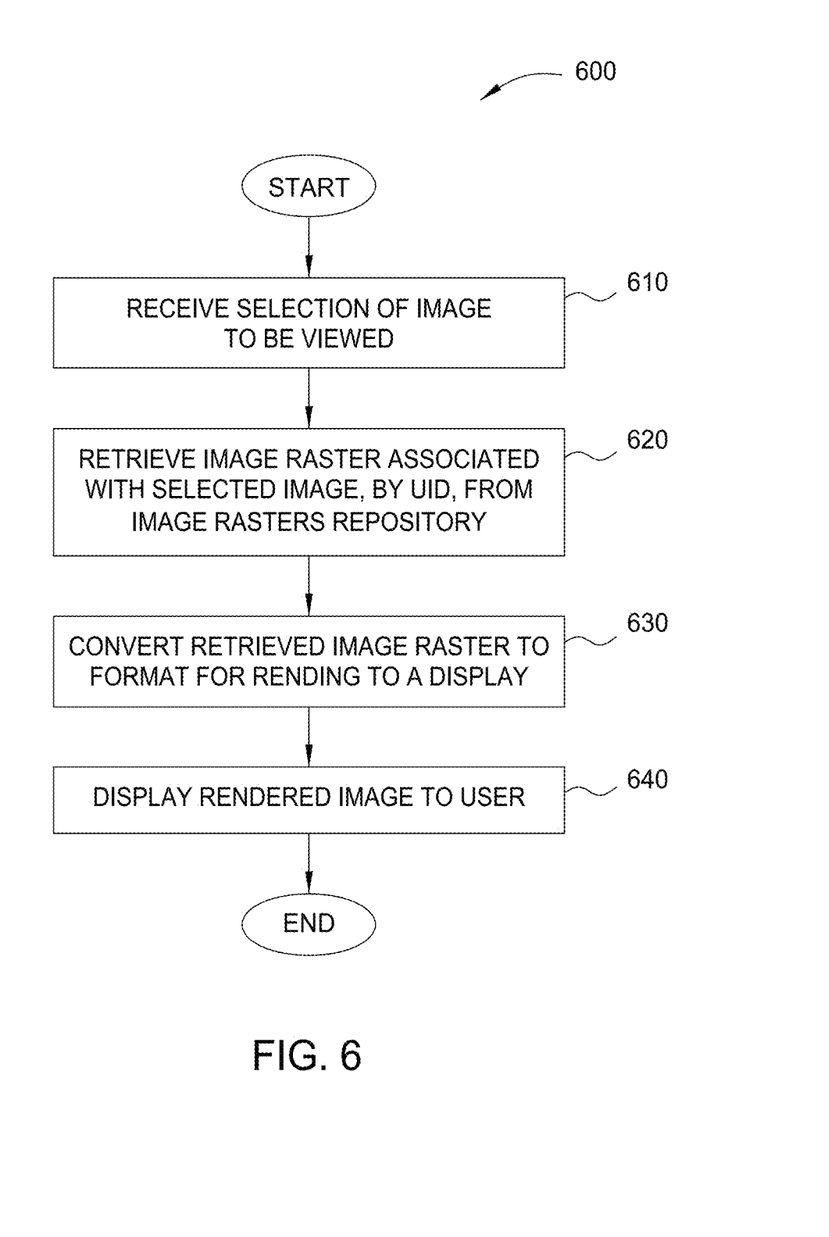
FIG. 6 illustrates a method for visualizing oilfield or wellbore measurement data stored as image rasters, according to an embodiment.

FIG. 6 illustrates a method 600 for visualizing oilfield (or wellbore) measurement data stored as image rasters, according to an embodiment. As shown, the method 600 begins at step 610, where a data visualization application receives a selection of an image to be viewed. For example, a user may select a particular inline or xline image to view via a user interface which permits the user to navigate through multiple inline and xline images.

At step 620, the data visualization application retrieves an image raster associated with the selected image, by UID, from an image rasters repository. As discussed, each inline and each xline image raster may be associated with a respective UID in one embodiment. In such a case, the data visualization application may determine a UID assigned to the selected image, and query the image rasters repository for image raster data associated with said UID.

At step 630, the data visualization application converts the data of the retrieved image raster to a format for rendering to a display. The image raster may be converted to, e.g., a JAVA image, or any other feasible image format, and thereafter rendered to, e.g., a buffer image. As discussed, the image rasters may be loaded into memory without downsampling, unlike large raw measurement data. That is, downsampling may be eliminated by storing and retrieving image rasters representing raw data, as opposed to traditional techniques in which images were generated on-the-fly using large quantities of raw data that had to be downsampled to fit into memory.

Then, at step 640, the data visualization application displays the rendered image to a user. As discussed, the image may be displayed in a 2D, 3D, or 4D visualization.

Figure 7:
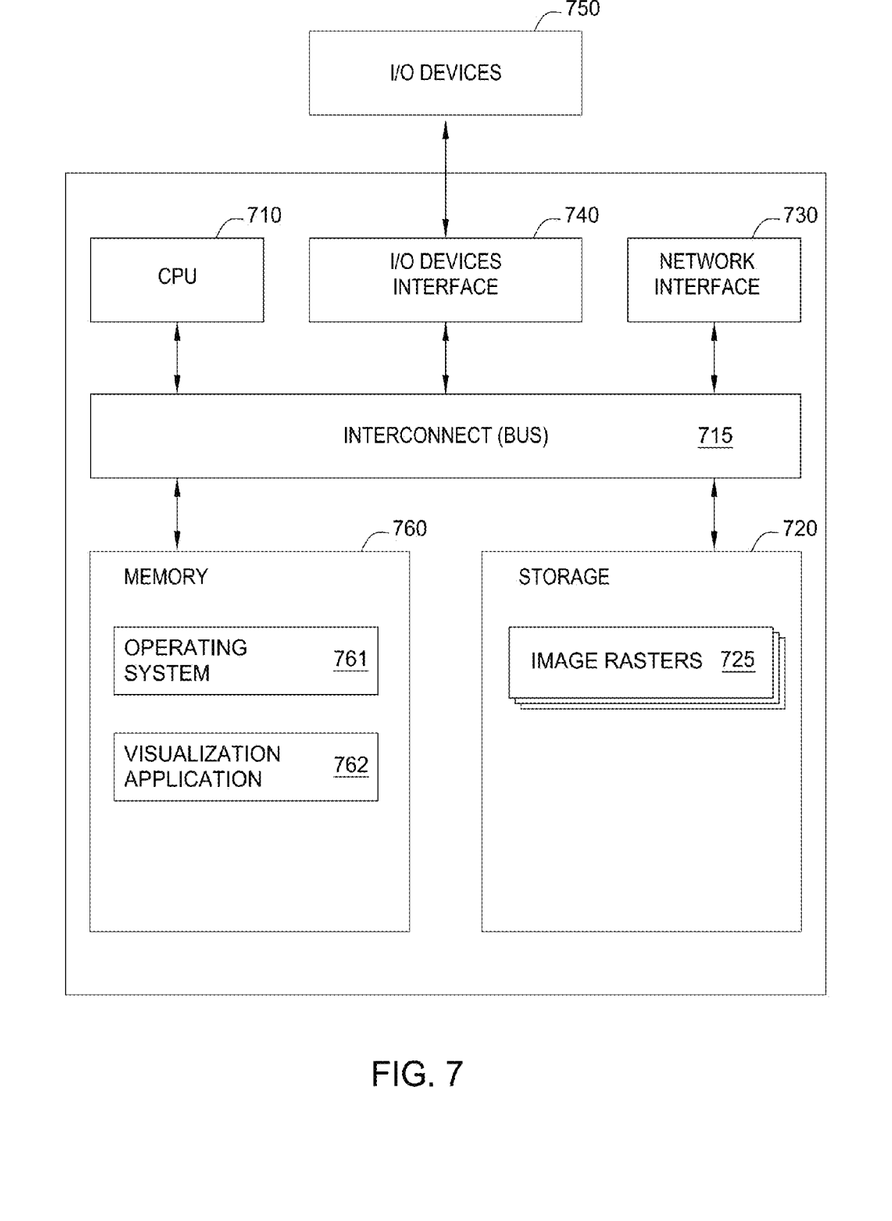
FIG. 7 depicts a block diagram of a system in which an embodiment may be implemented.

FIG. 7 depicts a block diagram of a system 700 in which an embodiment may be implemented. As shown, the system 700 includes, without limitation, a central processing unit (CPU) 710, a network interface 730, an interconnect 715, a memory 760 and storage 720. The system 700 may also include an I/O device interface 740 connecting I/O devices 750 (e.g., keyboard, display and mouse devices) to the system 400.

The CPU 710 retrieves and executes programming instructions stored in the memory 760. Similarly, the CPU 710 stores and retrieves application data residing in the memory 760. The interconnect 715 facilitates transmission, such as of programming instructions and application data, between the CPU 710, I/O device interface 740, storage 720, network interface 730, and memory 760. CPU 710 is included to be representative of a single CPU, multiple CPUs, a single CPU having multiple processing cores, and the like. And the memory 760 is generally included to be representative of a random access memory. The storage 720 may be, e.g., a disk drive storage device. Further, system 700 is included to be representative of a physical computing system as well as virtual machine instances hosted on a set of underlying physical computing systems. Further still, although shown as a single computing system, one of ordinary skill in the art will recognized that the components of the system 700 shown in FIG. 4 may be distributed across multiple computing systems connected by a data communications network.

As shown, the memory 760 includes an operating system 761 and data visualization application 762. For example, the operating system may be Microsoft's Windows®. The data visualization application 762 is configured to convert raw oilfield or wellbore measurement data to inline/xline image rasters 721 (or image rasters for other coordinate systems), assign UIDs to each image raster and trace, and store the image rasters 721 in the storage 720. The data visualization application 762 is further configured to fetch inline/xline image raster(s) by UID, convert the fetched image raster(s) to a format for rendering to a display, and cause the rendered images to be displayed to a user. In one embodiment, the data visualization application 762 may store the raw oilfield or wellbore measurement data in image rasters according to the method 500. In another embodiment, the data visualization application 762 may generate visualizations of the stored image rasters according to the method 600, discussed above.

Advantageously, techniques disclosed herein store oilfield or wellbore measurement data as image rasters. Doing so permits the data to be loaded into memory as image rasters, without down-sampling, and thereafter displayed to a user. Because the data is not down-sampled, critical trends and patterns in the data may be preserved. Further, techniques disclosed herein are not memory-intensive and are thus compatible with computing devices having relatively small quantities of memory, such as tablet computers and other handheld devices.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above discussion is meant to be illustrative of the principles and various embodiments of the present invention. Numerous variations and modifications will become apparent to those skilled in the art.

While the foregoing is directed to embodiments of the present invention, other and further embodiments of the invention may be devised without departing from the basic scope thereof, and the scope thereof is determined by the claims that follow.

What is claimed is:

1. A method of storing and managing measurements taken in an oilfield or wellbore, the method comprising:
   receiving the measurements as raw data, wherein the raw data is acquired by an oilfield measurement or wellbore monitoring device;
   converting the raw data to image rasters, wherein the converting does not comprise down-sampling the raw data, and wherein the converting includes:
      for each X coordinate of a plurality of X coordinates, stacking multiple Y coordinate planar trace image rasters to produce an image raster corresponding to the X coordinate, and
      for each Y coordinate of a plurality of Y coordinates, stacking multiple X coordinate planar trace image rasters to produce an image raster corresponding to the Y coordinate;
   assigning a unique identifier (UID) to each image raster converted without down-sampling the raw data; and
   storing the image rasters along with the assigned UIDs.

2. The method of claim 1, further comprising:
   retrieving, by UID, one of the stored image rasters;
   converting the retrieved image raster to an image format suitable for rendering to a display screen; and
   displaying a rendering of the converted image raster on the display screen.

3. The method of claim 1, wherein the raw data is converted to the image rasters according to a user-specified color map.

4. The method of claim 1, wherein the image rasters are stored in order of ascending or descending UID.

5. The method of claim 1, wherein converting the raw data to the image rasters includes normalizing the raw data values to a range of color values.

6. The method of claim 1, wherein the image rasters are stored in a binary storage format.

7. The method of claim 1, further comprising, assigning UIDs to the raw data, wherein the UIDs assigned to the raw data are separately stored in a relational database from the raw data, and wherein the raw data is queried using the UIDs assigned to the raw data without reading the raw data.

8. The method of claim 7, wherein pointers to locations of the raw data are stored along with the assigned UIDs, and wherein the raw data is retrieved based on locations indicated by the pointers.

9. A non-transitory computer-readable storage media storing instructions, which when executed by a computer system, perform operations for storing and managing measurements taken in an oilfield or wellbore, the operations comprising:
   receiving the measurements as raw data, wherein the raw data is acquired by an oilfield measurement or wellbore monitoring device;
   converting the raw data to image rasters, wherein the converting does not comprise down-sampling the raw data, and wherein the converting includes:
      for each X coordinate of a plurality of X coordinates, stacking multiple Y coordinate planar trace image rasters to produce an image raster corresponding to the X coordinate, and
      for each Y coordinate of a plurality of Y coordinates, stacking multiple X coordinate planar trace image rasters to produce an image raster corresponding to the Y coordinate;
   assigning a unique identifier (UID) to each image raster converted without down-sampling the raw data; and
   storing the image rasters along with the assigned UIDs.

10. The non-transitory computer-readable storage media of claim 9, the operations further comprising:
   retrieving, by UID, one of the stored image rasters;
   converting the retrieved image raster to an image format suitable for rendering to a display screen; and
   displaying a rendering of the converted image raster on the display screen.

11. The non-transitory computer-readable storage media of claim 9, wherein the raw data is converted to the image rasters according to a user-specified color map.

12. The non-transitory computer-readable storage media of claim 9, wherein the image rasters are stored in order of ascending or descending UID.

13. The non-transitory computer-readable storage media of claim 9, wherein converting the raw data to the image rasters includes normalizing the raw data values to a range of color values.

14. The non-transitory computer-readable storage media of claim 9, wherein the image rasters are stored in a binary storage format.

15. The non-transitory computer-readable storage media of claim 9, further comprising, assigning UIDs to the raw data, wherein the UIDs assigned to the raw data are separately stored in a relational database from the raw data, and wherein the raw data is queried using the UIDs assigned to the raw data without reading the raw data.

16. The non-transitory computer-readable storage media of claim 15, wherein pointers to locations of the raw data are stored along with the assigned UIDs, and wherein the raw data is retrieved based on locations indicated by the pointers.

17. A system, comprising:
a processor; and
a memory, wherein the memory includes an application program configured to perform operations for storing and managing measurements taken in an oilfield or wellbore, the operations comprising:
receiving the measurements as raw data, wherein the raw data is acquired by an oilfield measurement or wellbore monitoring device,
converting the raw data to image rasters, wherein the converting does not comprise down-sampling the raw data, and wherein the converting includes:
for each X coordinate of a plurality of X coordinates, stacking multiple Y coordinate planar trace image rasters to produce an image raster corresponding to the X coordinate; and
for each Y coordinate of a plurality of Y coordinates, stacking multiple X coordinate planar trace image rasters to produce an image raster corresponding to the Y coordinate,
assigning a unique identifier (UID) to each image raster converted without down-sampling the raw data, and
storing the image rasters along with the assigned UIDs.

18. The system of claim 17, the operations further comprising:
retrieving, by UID, one of the stored image rasters;
converting the retrieved image raster to an image format suitable for rendering to a display screen; and
displaying a rendering of the converted image raster on the display screen.

* * * * *